T. S. Hudson.
Manuf. of Inkstands.

No. 3964. Reissued May 10 1870.

Witnesses.
N. W. Stearns
W. J. Cambridge

Inventor
Thos. S. Hudson

United States Patent Office.

THOMAS SMITH HUDSON, OF EAST CAMBRIDGE, MASSACHUSETTS.

*Letters Patent No.* 94,113, *dated August* 24, 1869; *reissue No.* 3,964, *dated May* 10, 1870.

IMPROVEMENT IN MANUFACTURE OF INKSTANDS.

The Schedule referred to in these Letters Patent and making part of the same.

*To all persons to whom these presents may come:*

Whereas Letters Patent No. 94,113, dated August 24, 1869, have been granted to the undersigned, THOMAS SMITH HUDSON, of East Cambridge, of the county of Middlesex and State of Massachusetts, for a new and useful Improvement in the Manufacture of Inkstands; and whereas the undersigned has petitioned for a reissue of such Letters Patent, to correct a defect or defects therein, now, therefore, I, the said HUDSON, do hereby declare my said invention to be more fully described in the following specification, and represented in the accompanying drawings.

The said inkstand is of the class usually known under the term of "barometer or pneumatic inkstands," it having an air and liquid reservoir, dome, or fountain, closed at top, and opening at bottom into a well or cistern, provided with a filling-throat or orifice, having a cylindrical extension to receive the collar of a cap, there being an open space between such extension and the dome. The charge of liquid for the well and fountain is to be poured into the orifice in order, and when it may be necessary, to supply the inkstand with ink.

The article as made in accordance with my invention will suffice as a mucilage-receiver or stand, it being of glass, in one entire piece. It may also be employed for other useful purposes.

Of the drawings above mentioned—

Figure 2:
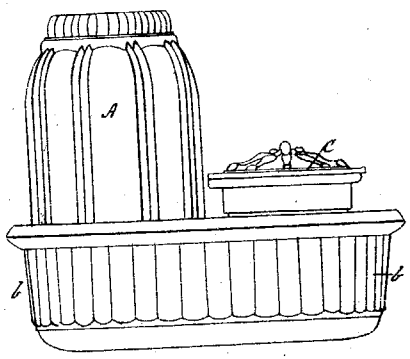
Figure 1:
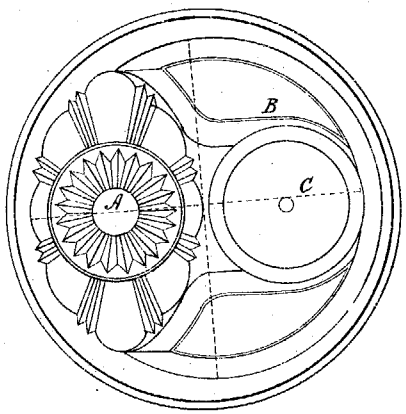

Figure 1 exhibits a top view;

Figure 2, a side elevation; and

Figure 3:
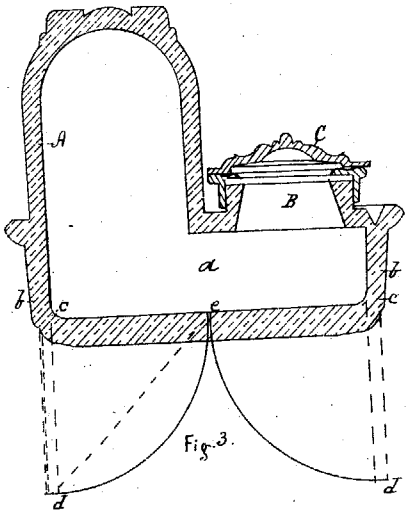

Figure 3, a vertical section of such article.

The latter figure represents, in dotted lines, a tubular extension of the walls or sides of the cistern or well of the inkstand, such extension, for the purpose of making the bottom of the cistern or well, being heated, and subsequently contracted or closed in all around it to a central point.

Prior to my present invention it has been customary to make the bottom of the cistern of a separate piece of glass, and afterward insert it in the open end or lower part of the cistern, and connect the two at the periphery of the bottom by a process well known to glass-workers.

In constructing my improved inkstand I avoid the separate bottom, and the disadvantages and expense attendant in making it and fitting it to the walls of the cistern, and I accomplish the making of the bottom by a tubular extension of the walls of the base, cistern, or well, and by subsequently contracting the said extension and closing it together.

The inkstand, as it is made prior to the construction and closing in of the extension, I term the "blank," it being usually cast or formed by means of a mold, consisting of a matrix and a plunger, suitable for the purpose.

In the drawings above mentioned—

A denotes the hollow dome, or air and liquid fountain;

B, the dipping-orifice or mouth; and

C, the cap or cover thereof.

The cylindrical space *a*, below the parts A and B, and extended laterally from them, constitutes the base-well or cistern, *b b* being the walls or sides of the base.

The cylindrical neck for reception of the collar part *o* of the cap C is shown at *n*, as wholly insulated from the part A, so as to enable the circular cap C and the part or collar *n* thereof to be used on the opening B without any restraint from the dome A.

The article as molded has a tubular extension, *d*, the body of glass being first pressed by a plunger into a mold, of the shape necessary to form the article or blank, not only with the fountain A, the cap, neck, or extension *n*, and the dipping-orifice or filling-opening B, made partly in such neck, but with the tubular parts *b* and *d* necessary to the formation of the sides and bottom of the base-well or cistern *a*.

The molded blank, after having been removed from the mold, may be supported in or by a suitable block or device, usually termed a "former," after which the part destined to form the bottom of the cistern should be heated to the proper temperature, and next should be contracted into, or nearly into a plane, and closed at or near the middle of the article, so as to form the intended bottom, as shown at *e*.

I am aware that the bottoms and other parts of inkstands, or other articles of glass, have been made in separate pieces, and subsequently been united together with glass joints. To the invention of such a method of manufacturing an inkstand or other article, I herein make no claim.

In my present inkstand, the cistern or part *b* constitutes a base for the support of the article, such base being cylindrical or prismatic in shape, and having a diameter larger than those of the fountain and dipping-orifice combined. This renders a metallic stand, such as other barometer inkstands have, unnecessary to my present inkstand.

Nor do I claim a glass inkstand as made with a dome, and a dipping-orifice, and a well or cistern, all formed by being blown into a mold, and having the blow-hole subsequently closed by contraction together of its sides.

Nor do I claim a glass inkstand as constructed with a dome, extended up from a stand or base, and having a dipping-projection extended from one side of such dome, the dome forming part of the boundary of the dipping-opening, the same rendering it difficult if not impossible to fit a cap collar to the dipping projection.

Nor do I claim an inkstand as composed of a hollow vessel, closed at top and bottom, and having a tubular nose or dipping extension projected from one side of such vessel.

Nor do I claim a glass inkstand, as represented in the United States Patent No. 76,792, dated April 14, 1868, and granted to G. Merritt, wherein the body of the inkstand is made of glass, with an opening in the top of the dome portion thereof; for the dome part of my inkstand is made wholly of glass, and with no opening except at its bottom.

Furthermore, the main body and funnel of Merritt's are formed in one piece by a single operation, by pressing the glass in molds, and blowing in a manner familiar to glass-workers. His is a blown inkstand, an article totally different from mine, as glass-workers will readily perceive.

What I claim as of my invention may be stated as follows:

The above-described new or improved manufacture of barometer inkstand or mucilage-receiver blank, made substantially as described, viz, with the air and liquid-fountain or dome A, open only at bottom, the dipping-orifice B, the neck *n*, isolated from the dome A, the connection well or stand-walls *b b*, and the tubular extension *d*, for being formed into a bottom by being heated and contracted, in manner substantially as specified, the whole being in one piece of glass.

THOMAS SMITH HUDSON.

Witnesses:
J. R. Snow,
L. N. Möller.